June 21, 1927. 1,633,511

R. J. BALDWIN

COMBINATION RADIATOR CONNECTION

Filed Dec. 19, 1925

Raymond J. Baldwin, INVENTOR

BY Victor J. Evans, ATTORNEY

Walter Chism, WITNESS

Patented June 21, 1927.

1,633,511

UNITED STATES PATENT OFFICE.

RAYMOND J. BALDWIN, OF WISSINOMING, PENNSYLVANIA.

COMBINATION RADIATOR CONNECTION.

Application filed December 19, 1925. Serial No. 76,555.

This invention relates to improvements in connections for heating system radiators, and more particularly to a multiple connection unit adapted for connecting the inlet and outlet pipe lines at one end of the radiator. The principal object of the invention is to provide a multiple connection unit whereby the inlet or supply pipe and the shut-off valve therefor, and the outlet or drain pipe may be connected to one end of a heating radiator for effectively eliminating the usual necessary extended pipe for making the outlet connection at the other end of the radiator.

Another object of the invention is to provide a multiple connection unit as specified, whereby the respective inlet and outlet water pipes may be readily and effectively connected to one of the usual two connecting apertures provided in a standard heating radiator, for eliminating the necessity of making a connection at the other end of the radiator, notching or cutting out portions of the floor joist and the subsequent weakening thereof and tearing up the flooring when replacing a hot air heating system with a modern hot water system.

A further object of the invention is to provide a multiple connection unit as specified, which will eliminate the common practice of placing the pipes for the inlet and outlet radiator connections in a horizontal position between the floor before or after the flooring has been put down, eliminates cutting out portions or boring clearance apertures in said joist, and insures the accurate placement of the inlet and outlet pipe connections for a radiator, regardless of the length or position of the radiator.

Another object of the invention is the provision of a device as specified, which is readily installed, cheap to manufacture, providing means for economical installation, effective and efficient for the purpose designed.

Other objects of the invention will appear in the following detail description, and in the accompanying drawing wherein:—

Figure 1:
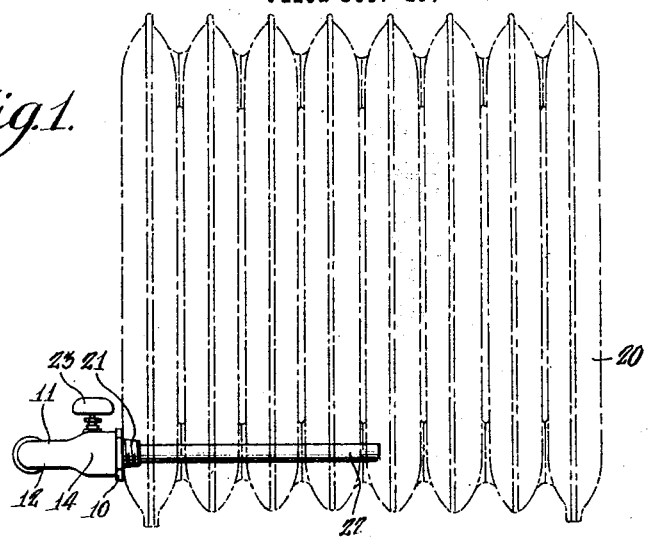
Figure 1 is a side elevation of the device, as connected to a radiator which is shown in dotted lines.
Figure 2:
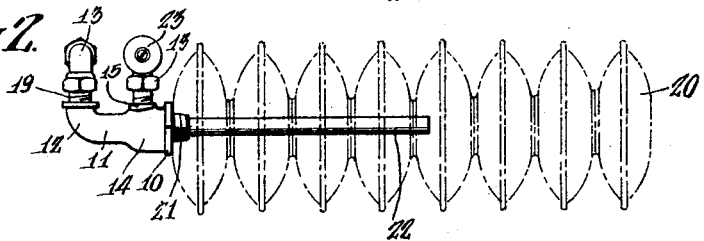
Figure 2 is a top plan view of the device as connected.
Figure 3:
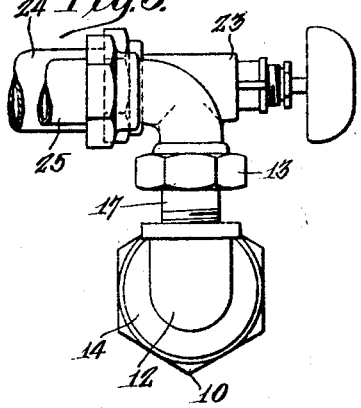
Figure 3 is an end elevation of the device.
Figure 4:
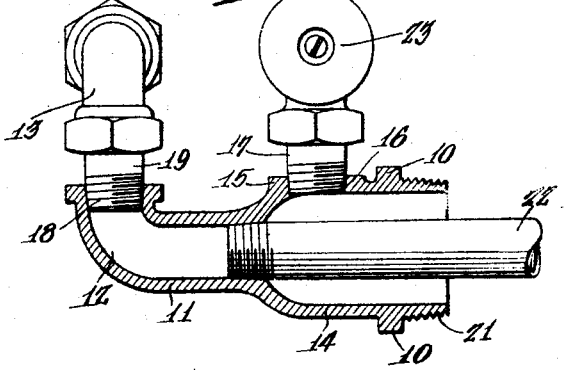
Figure 4 is a horizontal section of the device per se.

Referring more particularly to the drawings, the improved radiator connection comprises the usual radiator gland nut 10 which is cast integral with a gradually reduced extending portion 11 which terminates in an elbow 12 formed at right angles to the free extended end 13, of the extending portion 11. The laterally extending portion 11 formed integral with the gland nut 10, is further provided on the enlarged portion 14 immediately adjacent to the gland nut 10, with a boss 15, and said boss provided with a threaded aperture 16 for threadable engagement therein, of a connecting nipple 17. The elbow 12 formed integral with and at the extended end 13, is also provided with a threaded aperture 18 for engagement therein, of a second connecting nipple 19. Said nipples extending in a horizontal manner, and at right angles to the radiator 20 after the improved radiator connection has been securely threaded into the radiator by means of the gland nut 10, formed integral therewith.

Internally threaded in the extending portion 11, as indicated at 21, is a suitable pipe extension 22 which extends into the lower portion of the radiator 20 for a depth governed by the size of the radiator and which is provided for insuring the circulation of the incoming hot water into the radiator 20 before it enters the pipe extension 22 for return passage into the reduced portion of the extending portion 11, and out into the outlet pipe. The improved radiator connection now being secured to the radiator 20, a standard T-valve 23 is connected to the nipple 17 with the inlet or supply pipe 24 connected to the T-valve 23. Securely connected to the nipple 19, is a 45° elbow for threadable attachment thereto, of the outlet or return pipe 25. Said inlet and outlet pipes extending downwardly through the floor at right angles to the said laterally extending portion 11, and enter the said floor within the space necessary to accommodate the overall width of the radiator.

It is, of course, to be understood, that the invention may be constructed in various other manners, and the parts associated in different relations, and therefore, I do not desire to be limited in any manner, except as set forth in the claim hereunto appended.

What I claim is:—

The combination with a radiator, of a connecting member having inlet and outlet pipes, said member comprising a body with substantially one-half thereof of a relatively large diameter, the remaining portion being gradually reduced to a relatively small member provided with a reduced bore, a pipe threaded in the reduced bore and extending through the relatively large portion of the member and into the radiator, said relatively reduced portion extending laterally causing an elbow to be formed with an outlet opening, the wall of the relatively large portion having an inlet opening, and a control valve and an outlet pipe threadingly connected in said inlet and outlet openings respectively, one end of the large portion of the member having a gland nut formed integrally therewith, and beyond the nut, the outer face of the large portion being threaded, for attachment to the radiator.

In testimony whereof I affix my signature.

RAYMOND J. BALDWIN.